US011125179B2

(12) United States Patent
Hashimoto et al.

(10) Patent No.: US 11,125,179 B2
(45) Date of Patent: Sep. 21, 2021

(54) VEHICLE CONTROLLER, VEHICLE CONTROL SYSTEM, VEHICLE LEARNING DEVICE, VEHICLE LEARNING METHOD, VEHICLE CONTROL METHOD, AND MEMORY MEDIUM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/126,467

(22) Filed: Dec. 18, 2020

(65) Prior Publication Data

US 2021/0189991 A1 Jun. 24, 2021

(30) Foreign Application Priority Data

Dec. 23, 2019 (JP) .............................. JP2019-231147

(51) Int. Cl.
| | |
|---|---|
| *F02D 41/24* | (2006.01) |
| *F02D 41/26* | (2006.01) |
| *F02D 41/00* | (2006.01) |
| *F02B 77/08* | (2006.01) |
| *G06Q 30/02* | (2012.01) |

(52) U.S. Cl.
CPC ........ *F02D 41/2438* (2013.01); *F02B 77/084* (2013.01); *F02D 41/009* (2013.01); *F02D 41/2451* (2013.01); *F02D 41/263* (2013.01); *G06Q 30/0224* (2013.01); *F02D 2200/602* (2013.01)

(58) Field of Classification Search
CPC ............... F02D 41/2438; F02D 41/263; F02D 41/2451; F02D 41/009; F02D 2200/602; F02B 77/084; G06Q 30/0224
See application file for complete search history.

(56) References Cited

U.S. PATENT DOCUMENTS

| | | | | |
|---|---|---|---|---|
| 6,436,005 | B1 * | 8/2002 | Bellinger | ............ F02D 41/1497 477/111 |
| 2003/0216847 | A1 * | 11/2003 | Bellinger | .......... B60W 30/1819 701/51 |

(Continued)

FOREIGN PATENT DOCUMENTS

JP 2016-006327 A 1/2016

*Primary Examiner* — Joseph J Dallo
(74) *Attorney, Agent, or Firm* — Oblon, McClelland, Maier & Neustadt, L.L.P.

(57) ABSTRACT

A vehicle controller is provided. An update process updates a relationship defining data by inputting, to a predetermined update map, a state of a vehicle, a value of an action variable used to operate an electronic device, and a reward corresponding to that electronic device. A reward calculating process provides, based on the state of the vehicle obtained by an obtaining process, a greater reward when a characteristic of the vehicle meets a standard than when the characteristic of the vehicle does not meet the standard. A loosening process loosens the standard to a larger extent when the degree of deterioration is large than when the degree of deterioration is small.

10 Claims, 7 Drawing Sheets

(56) References Cited

U.S. PATENT DOCUMENTS

| | | | | |
|---|---|---|---|---|
| 2007/0021901 A1* | 1/2007 | Yamaguchi | ........... | F02D 41/401 |
| | | | | 701/105 |
| 2007/0240675 A1* | 10/2007 | Ban | ................... | F02D 41/2451 |
| | | | | 123/299 |
| 2008/0245142 A1* | 10/2008 | Bowling | ............... | G01M 15/06 |
| | | | | 73/114.26 |
| 2009/0025688 A1* | 1/2009 | Asano | ................. | F02D 41/2438 |
| | | | | 123/478 |
| 2010/0139624 A1* | 6/2010 | Surnilla | ............. | F02D 41/2464 |
| | | | | 123/511 |
| 2012/0303243 A1* | 11/2012 | Momose | .............. | F02D 11/105 |
| | | | | 701/102 |
| 2014/0278010 A1* | 9/2014 | Hamama | .............. | F02D 35/027 |
| | | | | 701/106 |
| 2015/0203118 A1* | 7/2015 | Mitsuyasu | ........... | B60W 10/02 |
| | | | | 701/67 |
| 2016/0273473 A1* | 9/2016 | Dudar | .................... | G01M 1/00 |
| 2016/0363077 A1* | 12/2016 | Suzuki | ................. | F02D 35/028 |
| 2016/0363081 A1* | 12/2016 | Osaka | ................. | F02D 41/1406 |
| 2017/0116477 A1* | 4/2017 | Chen | .................. | G06K 9/00651 |
| 2017/0184041 A1* | 6/2017 | Konomi | ................ | F02D 41/10 |
| 2017/0184042 A1* | 6/2017 | Konomi | ................ | F16H 63/50 |
| 2017/0314500 A1* | 11/2017 | Ogata | ................. | F02D 41/0072 |
| 2017/0350333 A1* | 12/2017 | Glugla | ............... | F02D 41/1446 |
| 2018/0209355 A1* | 7/2018 | Nakane | ................ | F02D 41/123 |
| 2018/0340476 A1* | 11/2018 | Hanshaw | ............. | F01L 1/3442 |
| 2019/0120147 A1* | 4/2019 | Leone | ................ | F02D 13/0215 |
| 2019/0120160 A1* | 4/2019 | Leone | .................. | F02B 75/045 |

* cited by examiner

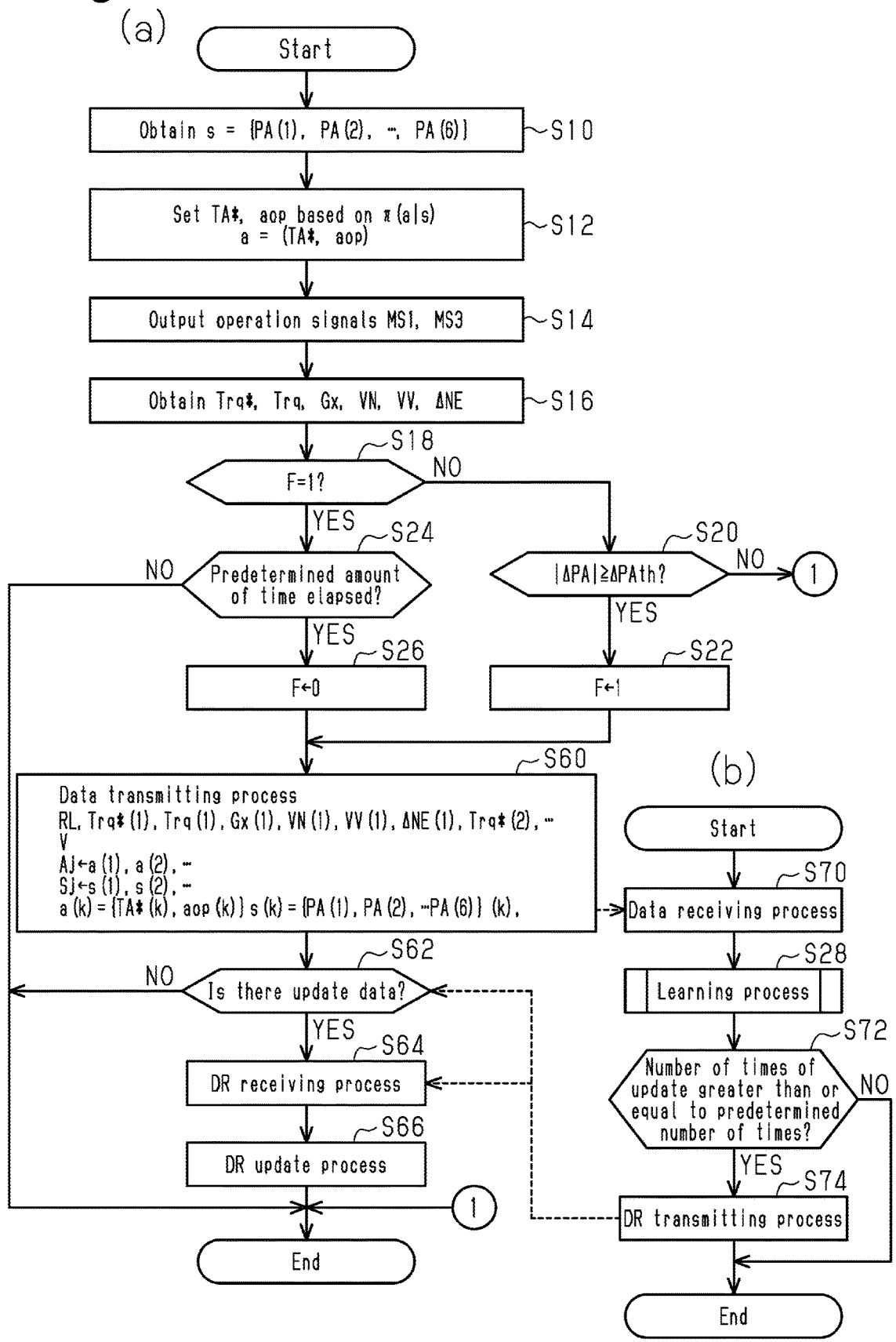

VEHICLE CONTROLLER, VEHICLE CONTROL SYSTEM, VEHICLE LEARNING DEVICE, VEHICLE LEARNING METHOD, VEHICLE CONTROL METHOD, AND MEMORY MEDIUM

BACKGROUND

1. Field

The present disclosure relates to a vehicle controller, a vehicle control system, a vehicle learning device, and a vehicle learning method.

2. Description of Related Art

For example, Japanese Laid-Open Patent Publication No. 2016-6327 discloses a controller that controls a throttle valve, which is an operated unit of an internal combustion engine mounted on a vehicle, based on a value processing an operation amount of an accelerator pedal with a filter.

The above-described filter is required to set the operation amount of the throttle valve of the internal combustion engine mounted on the vehicle to an appropriate operation amount in accordance with the operation amount of the accelerator pedal. Thus, adaptation of the filter requires a great number of man-hours by skilled workers.

In this manner, adaptation of operation amounts of electronic devices on a vehicle in accordance with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: A vehicle controller is provided that includes an execution device and a memory device. The memory device is configured to store relationship defining data that defines a relationship between a state of a vehicle and an action variable related to an operation of an electronic device in the vehicle. The execution device is configured to execute an obtaining process that obtains the state of the vehicle based on a detection value of a sensor, an operation process that operates the electronic device based on a value of the action variable, the action variable being determined by the relationship defining data and the state of the vehicle obtained by the obtaining process, a reward calculating process that provides, based on the state of the vehicle obtained by the obtaining process, a greater reward when a characteristic of the vehicle meets a standard than when the characteristic of the vehicle does not meet the standard, and an update process that updates the relationship defining data by inputting, to a predetermined update map, the state of the vehicle obtained by the obtaining process, the value of the action variable used to operate the electronic device, and the reward corresponding to the operation of the electronic device. The update map outputs the updated relationship defining data so as to increase an expected return for the reward in a case where the electronic device is operated in accordance with the relationship defining data. The obtaining process includes a process that obtains a deterioration variable as the state of the vehicle, the deterioration variable indicating a degree of deterioration of the vehicle. The reward calculating process includes a loosening process that loosens the standard to a larger extent when the degree of deterioration is large than when the degree of deterioration is small.

This configuration calculates a reward that accompanies operation of the electronic device, so as to acquire the type of the reward obtained through that operation. Then, the relationship defining data is updated based on the reward, using the update map according to reinforcement learning. The relationship between the state of the vehicle and the action variable thus can be set to a relationship suitable for traveling of the vehicle. This reduces the man-hours required for skilled workers when the relationship between the state of the vehicle and the action variable is set to a relationship suitable for traveling of the vehicle.

When the deterioration of the vehicle progresses, only a small reward is provided even if the value of the action variable is selected in any manner. In this case, for the value of the action variable employed for the operation process, a small reward is provided without exception. Thus, as compared to expected returns in other action variables, there is no value of the action variable with a high expected return and a greedy action may not able to be selected. The above-described configuration loosens the standard to provide a reward when the degree of deterioration is large. This prevents situations in which small rewards are provided, without exception, for the values of all the action variables.

Aspect 2: In the vehicle controller according to Aspect 1, the standard includes a condition in which a value of a noise-vibration variable is less than or equal to a noise-vibration upper limit, the noise-vibration variable being a variable that indicates one of vibration and noise of the vehicle. The reward calculating process includes a process that provides a greater reward when the value of the noise-vibration variable is less than or equal to the noise-vibration upper limit than when the value of the noise-vibration variable is greater than the noise-vibration upper limit. The loosening process includes a process that sets the noise-vibration upper limit to be greater when the degree of deterioration is large than when the degree of deterioration is small.

As the vehicle deteriorates, it may become difficult to limit the vibration and noise of the vehicle. With the above-described configuration, the noise-vibration upper limit is set to be greater when the degree of deterioration is large than when the degree of deterioration is small. This further ensures the discovery of the value of the action variable in which the value of the noise-vibration variable is less than or equal to the noise-vibration upper limit even in a deteriorated vehicle.

Aspect 3: In the vehicle controller according to Aspect 1 or 2, the vehicle includes an internal combustion engine as a propelling force generator. The standard includes a condition in which a magnitude of a rotation fluctuation of a crankshaft of the internal combustion engine is less than or equal to a fluctuation upper limit. The loosening process includes a process that sets the fluctuation upper limit to be greater when the degree of deterioration is large than when the degree of deterioration is small.

As the vehicle deteriorates, it may become difficult to limit the rotation fluctuation of the crankshaft of the internal combustion engine. With the above-described configuration, the fluctuation upper limit is set to be greater when the degree of deterioration is large than when the degree of deterioration is small. This further ensures the discovery of the value of the action variable in which the magnitude of the rotation fluctuation is less than or equal to the fluctuation upper limit even in a deteriorated vehicle.

Aspect 4: In the vehicle controller according to any one of Aspects 1 to 3, the standard includes a condition in which an energy use efficiency of a propelling force generator mounted on the vehicle is greater than or equal to an efficiency lower limit. The loosening process includes a process that sets the efficiency lower limit to be smaller when the degree of deterioration is large than when the degree of deterioration is small.

When the vehicle deteriorates, the energy use efficiency may decrease as compared to prior to the deterioration. With the above-described configuration, the efficiency lower limit is set to be smaller when the degree of deterioration is large than when the degree of deterioration is small. This further ensures the discovery of the value of the action variable in which the energy use efficiency is greater than or equal to the efficiency lower limit even in a deteriorated vehicle.

Aspect 5: A vehicle control system is provided that includes the execution device and the memory device in the vehicle controller according to Aspect 1 or 2, The execution device includes a first execution device mounted on the vehicle and a second execution device that is different from an in-vehicle device. The second execution device is configured to execute at least the update process. The first execution device is configured to execute at least the obtaining process and the operation process.

With the above-described configuration, the update process is executed by the second execution device. Thus, as compared to a case in which the update process is executed by the first execution device, the computation load on the first execution device is reduced.

The phrase "a second execution device that is different from an in-vehicle device" means that the second execution device is not an in-vehicle device.

Aspect 6: A vehicle control device is provided that includes the first execution device in the vehicle control system according to Aspect 5.

Aspect 7: A vehicle learning device is provided that includes the second execution device in the vehicle control system according to Aspect 5.

Aspect 8: A vehicle learning method is provided that causes a computer to execute the obtaining process, the operation process, the reward calculating process, and the update process in the vehicle controller according to Aspects 1 to 4.

Aspect 9: A vehicle control method is provided that performs the various processes described in any one of Aspects 1 to 4 using an execution device and a memory device.

Aspect 10: A computer readable memory medium is provided that stores a vehicle control process causes an execution device and a memory device to perform the various processes described in any one of Aspects 1 to 4.

The method and the memory device have operational advantages similar to those of Aspect 1 above.

Other features and aspects will be apparent from the following detailed description, the drawings, and the claims.

BRIEF DESCRIPTION OF THE DRAWINGS

FIG. 7 includes sections (a) and (b), which show a procedure of processes executed by the vehicle control system of FIG. 6.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle controller 70 according to a first embodiment will now be described with reference to FIGS. 1 to 3.

Figure 1:
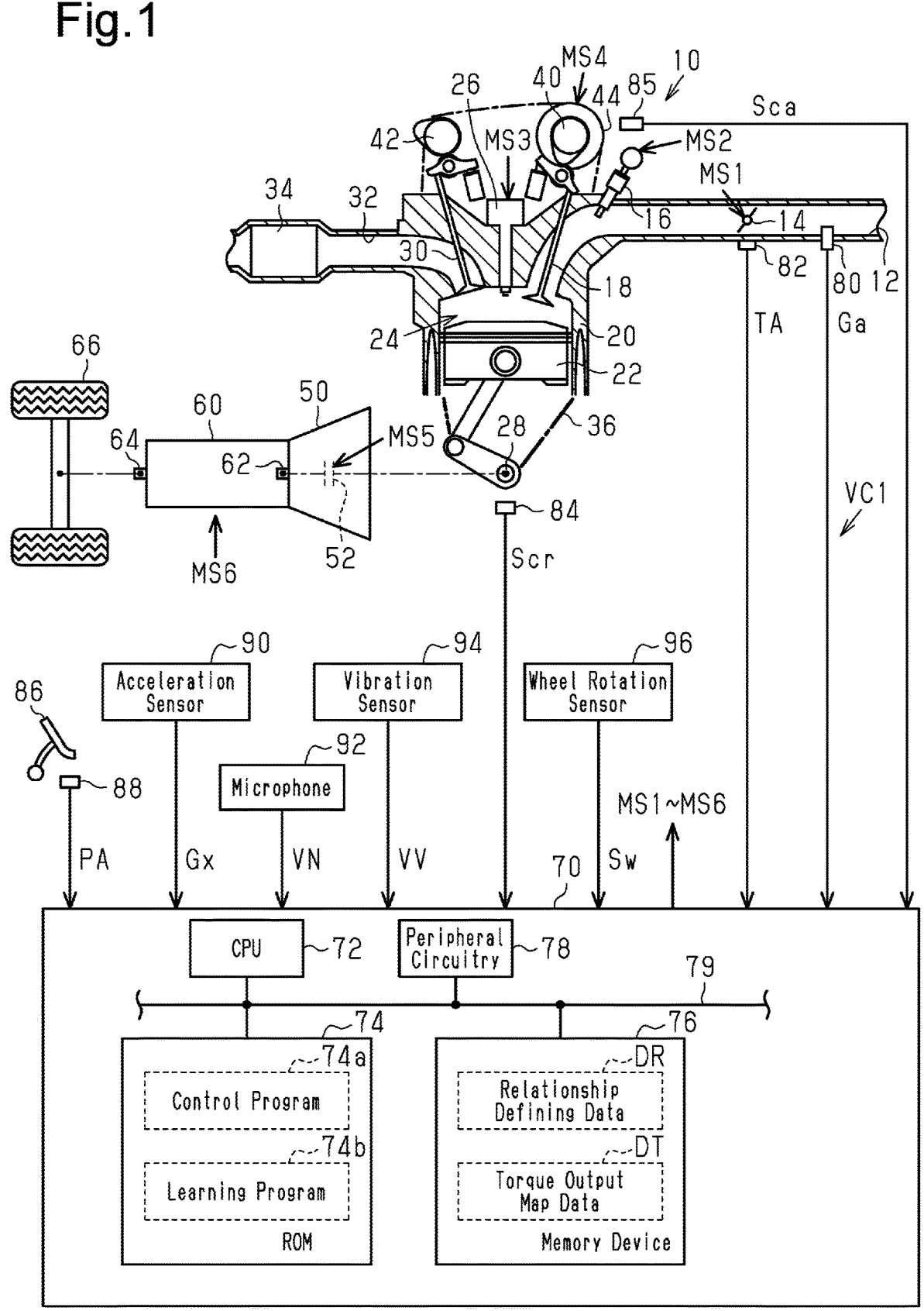
FIG. 1 is a diagram showing a controller and its drive system according to a first embodiment of the present disclosure.

FIG. 1 shows the configuration of a drive system of a vehicle VC1 and the controller 70 according to the present embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. In the combustion chamber 24, air-fuel mixture is burned by spark discharge of an ignition device 26. The energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The rotation power of the crankshaft 28 is transmitted through the timing chain 36 to the intake camshaft 40 and the exhaust camshaft 42. Specifically, the rotation power of the crankshaft 28 is transmitted to the intake camshaft 40 through an intake valve timing adjustment device 44.

The crankshaft 28 is mechanically couplable to an input shaft 62 of a transmission 60 via a torque converter 50 equipped with a lockup clutch 52. The transmission 60 variably sets the gear ratio, which is the ratio of the rotation speed of the input shaft 62 and the rotation speed of an output shaft 64. The output shaft 64 is mechanically coupled to driven wheels 66.

The controller 70 controls the internal combustion engine 10 and operates operated units of the engine 10 such as the throttle valve 14, the fuel injection valve 16, the ignition device 26, and the intake valve timing adjustment device 44, thereby controlling the torque and the ratios of exhaust components, which are controlled variables of the internal combustion engine 10. The controller 70 also controls the torque converter 50 and operates the lockup clutch 52 to control the engagement state of the lockup clutch 52. Further, the controller 70 controls and operates the transmission 60, thereby controlling the gear ratio, which is the controlled variable of the transmission 60. FIG. 1 shows operation signals MS1 to MS6 respectively corresponding to the throttle valve 14, the fuel injection valve 16, the ignition device 26, the intake valve timing adjustment device 44, the lockup clutch 52, and the transmission 60.

To control the controlled variables, the controller 70 refers to an intake air amount Ga detected by an air flow meter 80, an opening degree of the throttle valve 14 detected by a throttle sensor 82 (throttle opening degree TA), an output signal Scr of a crank angle sensor 84, and an output signal Sca of a cam angle sensor 85. The controller 70 also refers to a depression amount of an accelerator pedal 86 (accelerator operation amount PA) detected by an accelerator sensor 88 and an acceleration Gx in the front-rear direction of the vehicle VC1 detected by an acceleration sensor 90. Further, the controller 70 refers to a noise intensity VN detected by a microphone 92, a vibration intensity VV detected by a vibration sensor 94, and an output signal Sw of a wheel rotation sensor 96, which detects rotation of the driven wheels 66.

The controller 70 includes a CPU 72, a ROM 74, a nonvolatile memory that can be electrically rewritten (memory device 76), and peripheral circuitry 78, which can communicate with one another through a local network 79. The peripheral circuitry 78 includes a circuit that generates a clock signal regulating operation inside the controller 70, a power supply circuit, and a reset circuit.

The ROM 74 stores a control program 74a and a learning program 74b. The memory device 76 stores relationship defining data DR, which defines the relationship of the accelerator operation amount PA with a command value of the throttle opening degree TA (throttle command value TA*) and a retardation amount aop of the ignition device 26. The retardation amount aop is a retardation amount in relation to a predetermined reference ignition timing. The reference ignition timing is the more retarded one of the MBT ignition timing and the knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions when a large-octane-number fuel, which has a large knock limit value, is used. The memory device 76 also stores torque output map data DT. The torque output map data DT defines a torque output map. A rotation speed NE of the crankshaft 28, a charging efficiency η, and the ignition timing are input to the torque output map, which in turn outputs a torque Trq.

Figure 2:
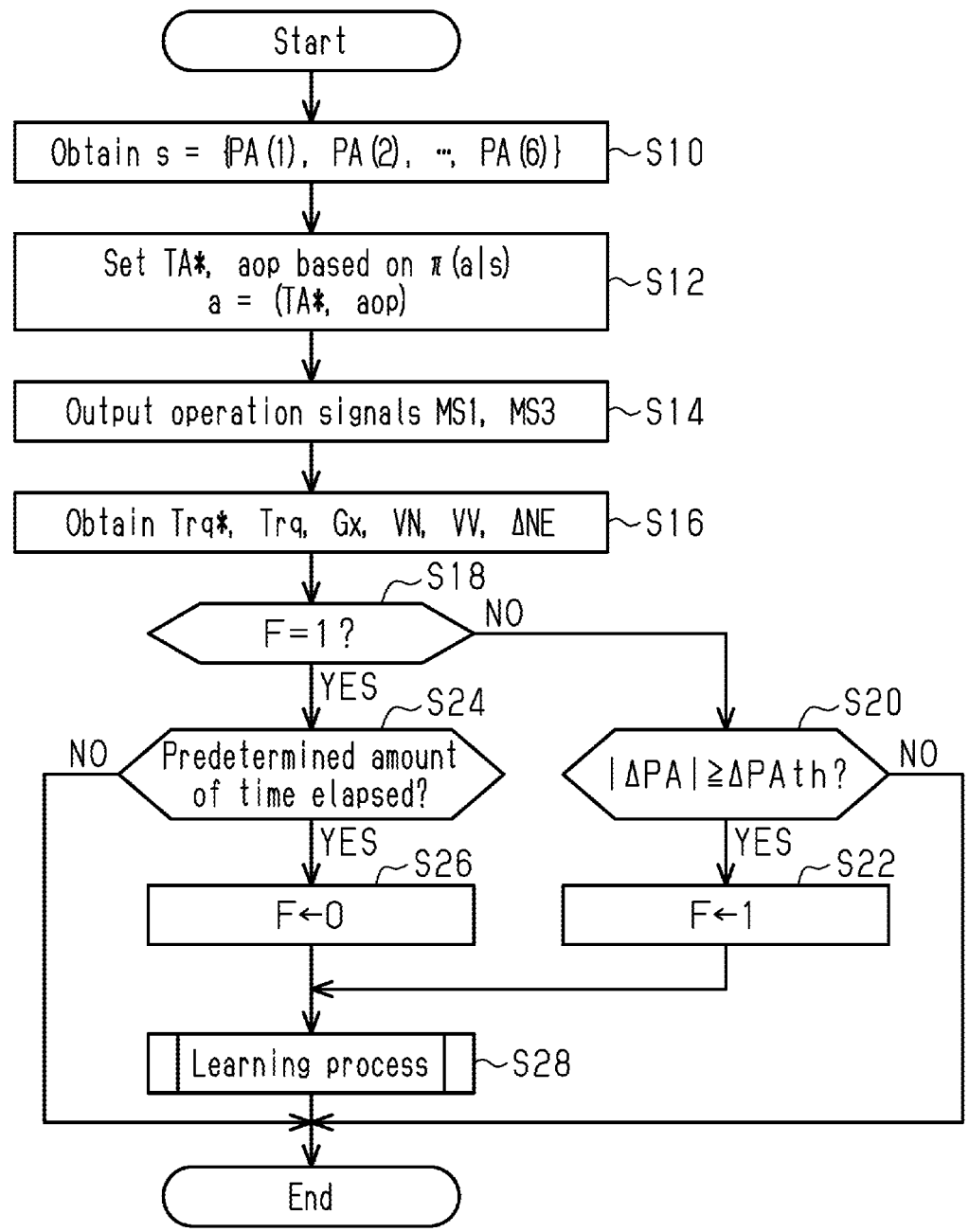
FIG. 2 is a flowchart showing a procedure of processes executed by the controller according to the first embodiment.

FIG. 2 shows a procedure of processes executed by the controller 70 of the present embodiment. The processes shown in FIG. 2 are implemented by the CPU 72 repeatedly executing the control program 74a and the learning program 74b stored in the ROM 74, for example, at predetermined intervals. In the following description, the number of each step is represented by the letter S followed by a numeral.

In the series of processes shown in FIG. 2, the CPU 72 first acquires, as a state s, time-series data including six sampled values PA(1), PA(2), . . . PA(6) (S10). The sampled values included in the time-series data have been sampled at different points in time. In the present embodiment, the time-series data includes six sampled values that are consecutive in time in a case in which the values are sampled at a constant sample period.

Next, in accordance with a policy 7 defined by the relationship defining data DR, the CPU 72 sets an action a corresponding to the state s obtained through the process of S10 (S12). The action a includes the throttle command value TA* and the retardation amount aop.

In the present embodiment, the relationship defining data DR is used to define an action value function Q and the policy π. In the present embodiment, the action value function Q is a table-type function representing values of expected return in accordance with eight-dimensional independent variables of the state s and the action a. When a state s is provided, the action value function Q includes values of the action a at which the independent variable is the provided state s. Among these values, the one at which the expected return is maximized is referred to as a greedy action. The policy π defines rules with which the greedy action is preferentially selected, and an action a different from the greedy action is selected with a predetermined probability.

Specifically, the number of the values of the independent variable of the action value function Q according to the present embodiment is obtained by deleting a certain amount from all the possible combinations of the state s and the action a, referring to human knowledge and the like. For example, in time-series data of the accelerator operation amount PA, human operation of the accelerator pedal 86 would never create a situation in which one of two consecutive values is the minimum value of the accelerator operation amount PA and the other is the maximum value. Accordingly, the action value function Q is not defined for this combination of the values of the accelerator operation amount PA. In the present embodiment, reduction of the dimensions based on human knowledge limits the number of the possible values of the state s defined by the action value function Q to a number less than or equal to 10 to the fourth power, and preferably, to a number less than or equal to 10 to the third power.

Next, the CPU 72 outputs the operation signal MS1 to the throttle valve 14 based on the set throttle command value TA* and retardation amount aop, thereby controlling the throttle opening degree TA, and outputs the operation signal MS3 to the ignition device 26, thereby controlling the ignition timing (S14). The present embodiment illustrates an example in which the throttle opening degree TA is feedback-controlled to the throttle command value TA*. Thus, even if the throttle command value TA* remains the same value, the operation signal MS1 may have different values. For example, when a known knock control system (KCS) is operating, the value obtained by retarding the reference ignition timing by the retardation amount aop is used as the value of the ignition timing corrected through feedback correction in the KCS. The reference ignition timing is varied by the CPU 72 in correspondence with the rotation speed NE of the crankshaft 28 and the charging efficiency η. The rotation speed NE is calculated by the CPU 72 based on the output signal Scr of the crank angle sensor 84. The charging efficiency r is calculated by the CPU 72 based on the rotation speed NE and the intake air amount Ga.

The CPU 72 obtains the torque Trq of the internal combustion engine 10, a torque command value Trq*, the acceleration Gx, the noise intensity VN, the vibration intensity VV, and a rotation fluctuation ΔNE (S16). The CPU 72 calculates the torque Trq by inputting the rotation speed NE and the charging efficiency η to the torque output map. Further, the CPU 72 sets the torque command value Trq* in accordance with the accelerator operation amount PA. Furthermore, the CPU 72 calculates the rotation fluctuation ΔNE as, for example, the difference between the maximum value and the minimum value of an instantaneous rotation speed in a predetermined crank angle region. The instantaneous rotation speed refers to the rotation speed of the crankshaft 28 in an interval shorter than an appearance interval of the compression top dead center.

Next, the CPU 72 determines whether a transient flag F is 1 (S18). The value 1 of the transient flag F indicates that a transient operation is being performed, and the value 0 of the transient flag F indicates that the transient operation is not being performed. When determining that the transient flag F is 0 (S18: NO), the CPU 72 determines whether the absolute value of a change amount per unit time ΔPA of the accelerator operation amount PA is greater than or equal to a predetermined amount ΔPAth (S20). The change amount per unit time ΔPA simply needs to be the difference between the latest accelerator operation amount PA at the point in time of execution of S20 and the accelerator operation amount PA of the point in time that precedes the execution of S20 by a certain amount of time.

When determining that the absolute value of the change amount per unit time ΔPA is greater than or equal to the predetermined amount ΔPAth (S20: YES), the CPU 72 assigns 1 to the transient flag F (S22).

In contrast, when determining that the transient flag F is 1 (S18: YES), the CPU 72 determines whether a predetermined amount of time has elapsed from the point in time of execution of the process of S22 (S24). The predetermined amount of time is an amount of time during which the absolute value of the change amount per unit time ΔPA of the accelerator operation amount PA remains less than or equal to a specified amount that is less than the predetermined amount ΔPAth. When determining that the predetermined amount of time has elapsed from the point in time of execution of S22 (S24: YES), the CPU 72 assigns 0 to the transient flag F (S26).

When the process of S22 or S26 is completed, the CPU 72 assumes that one episode has ended and performs reinforcement learning to update the relationship defining data DR (S28).

Figure 3:
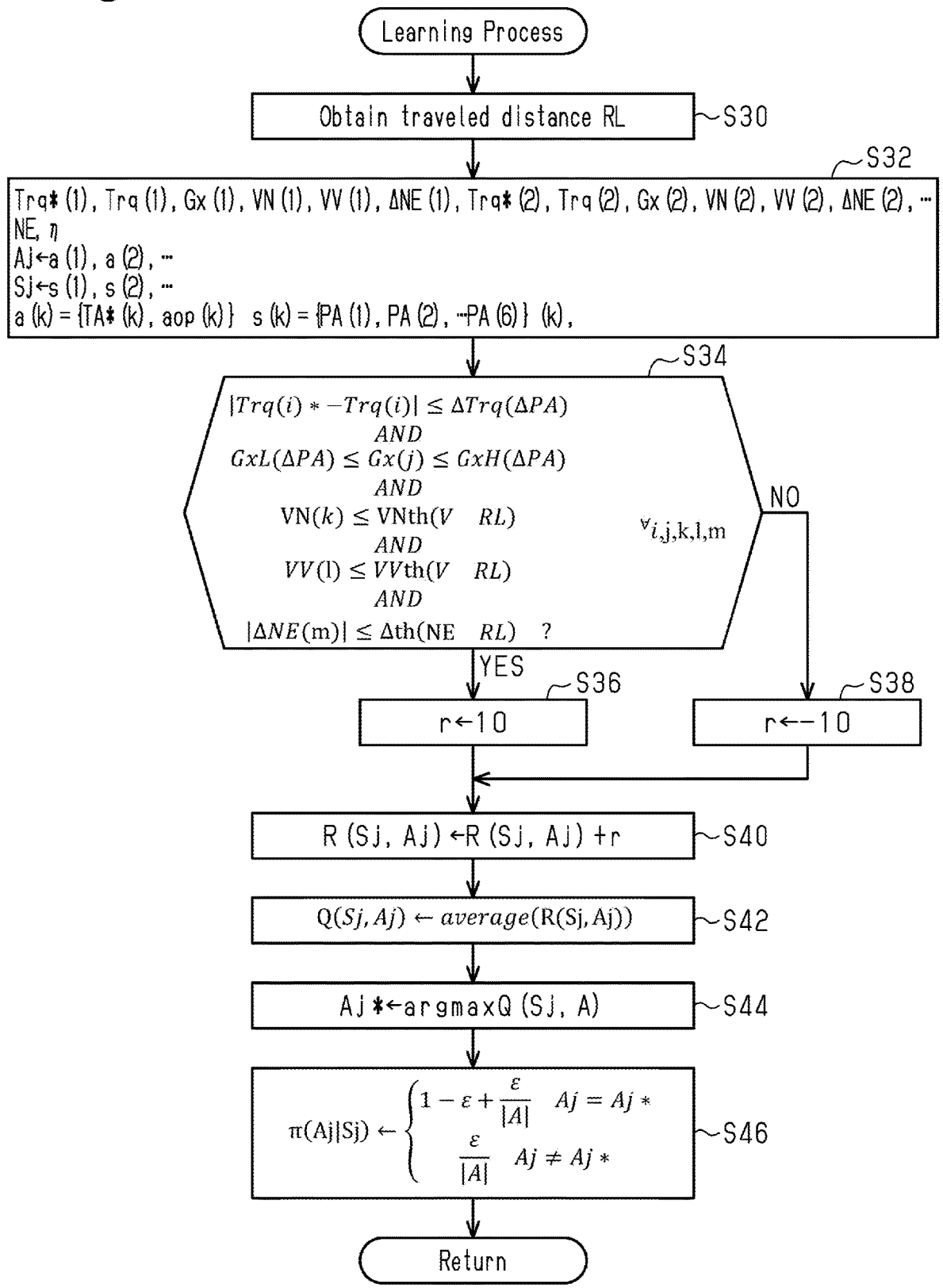
FIG. 3 is a flowchart showing a detailed procedure of some of the processes executed by the controller according to the first embodiment.

FIG. 3 illustrates the details of the process of S28.

In the series of processes shown in FIG. 3, the CPU 72 first acquires a traveled distance RL (S30). The traveled distance RL is calculated by the CPU 72 based on the output signal Sw of the wheel rotation sensor 96. Subsequently, the CPU 72 acquires time-series data including groups of sampled values of the torque command value Trq*, the torque Trq, the acceleration Gx, the noise intensity VN, the vibration intensity VV, and the rotation fluctuation ΔNE in the episode that has been ended most recently, the rotation speed NE and charging efficiency η, and time-series data of the state s and the action a (S32). The time period of the most recent episode is a time period during which the transient flag F was continuously 0 if the process of S32 of FIG. 3 is executed after the process of S22 of FIG. 2. The time period of the most recent episode is a time period during which the transient flag F was continuously 1 if the process of S32 of FIG. 3 is executed after the process of S26 of FIG. 2.

In FIG. 3, variables of which the numbers in parentheses are different are variables at different sampling points in time. For example, a torque command value Trq*(1) and a torque command value Trq*(2) have been obtained at different sampling points in time. The time-series data of the action a belonging to the most recent episode is defined as an action set Aj, and the time-series data of the state s belonging to the same episode is defined as a state set Sj.

Next, the CPU 72 determines whether the logical conjunction of the following conditions (i) to (v) is true (S32).

The condition (i) is that the absolute value of the difference between all the torques Trq belonging to the most recent episode and the torque command value Trq* is less than or equal to a specified amount ΔTrq. The CPU 72 varies the specified amount ΔTrq depending on the change amount per unit time ΔPA of the accelerator operation amount PA at the start of the episode. That is, the CPU 72 determines that the episode is related to transient time if the absolute value of the change amount per unit time ΔPA is great and sets the specified amount ΔTrq to a greater value than in a case in which the episode is related to steady time.

The condition (ii) is that all the accelerations Gx belonging to the most recent episode are greater than or equal to a lower limit GxL and less than or equal to an upper limit GxH. The CPU 72 varies the lower limit GxL depending on the change amount per unit time ΔPA of the accelerator operation amount PA at the start of the episode. That is, when the episode is related to transient time and the change amount per unit time ΔPA has a positive value, the CPU 72 sets the lower limit GxL to a greater value than in a case in which the episode is related to steady time. When the episode is related to transient time and the change amount per unit time ΔPA has a negative value, the CPU 72 sets the lower limit GxL to a smaller value than in a case in which the episode is related to steady time. Also, the CPU 72 varies the upper limit GxH depending on the change amount per unit time ΔPA per unit time of the accelerator operation amount PA at the start of the episode. That is, when the episode is related to transient time and the change amount per unit time ΔPA has a positive value, the CPU 72 sets the upper limit GxH to a greater value than in a case in which the episode is related to steady time. When the episode is related to transient time and the change amount per unit time ΔPA has a negative value, the CPU 72 sets the lower upper limit GxH to a smaller value than in a case in which the episode is related to steady time.

The condition (iii) is that all the noise intensities VN belonging to the most recent episode are less than or equal to a noise upper limit VNth. The CPU 72 varies the noise upper limit VNth in correspondence with the vehicle speed V and the traveled distance RL. Specifically, the CPU 72 sets the noise upper limit VNth to be smaller when the vehicle speed V is low than when the vehicle speed V is high in view of the fact that the user is more likely to be bothered by noise when the vehicle speed V is low than when the vehicle speed V is high. The vehicle speed V is calculated by the CPU 72 based on the output signal Sw of the wheel rotation sensor 96. The CPU 72 sets a greater noise upper limit VNth when the traveled distance RL is greater than or equal to a predetermined distance than when the traveled distance RL is less than the predetermined distance. This is because deterioration of the vehicle VC1 (for example, an increase in the friction of a sliding part of the vehicle VC1 or a decrease in the elasticity of an engine mount) makes it more difficult to set the noise intensity VN to be less than or equal to the noise upper limit VNth as compared with prior to the deterioration of the vehicle VC1. For example, the predetermined distance is preferably greater than or equal to fifty thousand kilometers and is more preferably greater than or equal to one hundred thousand kilometers.

The condition (iv) is that all the vibration intensities VV belonging to the most recent episode are less than or equal to a vibration upper limit VVth. The CPU 72 varies the vibration upper limit VVth in correspondence with the vehicle speed V and the traveled distance RL. Specifically, the CPU 72 sets the vibration upper limit VVth to be smaller when the vehicle speed V is low than when the vehicle speed V is high in view of the fact that the user is more likely to be bothered by vibration when the vehicle speed V is low than when the vehicle speed V is high. The CPU 72 sets a greater vibration upper limit VVth when the traveled distance RL is greater than or equal to the predetermined distance than when the traveled distance RL is less than the predetermined distance.

The condition (v) is that the absolute values of all the rotation fluctuations ΔNE belonging to the most recent episode are greater than or equal to a fluctuation upper limit Δth. The CPU 72 varies the fluctuation upper limit Δth in correspondence with the rotation speed NE and the traveled distance RL. Specifically, the CPU 72 sets the fluctuation upper limit Δth to be smaller when the rotation speed NE is low than when the rotation speed NE is high. The CPU 72 sets a greater fluctuation upper limit Δth when the traveled distance RL is greater than or equal to the predetermined distance than when the traveled distance RL is less than the predetermined distance. This is because the deterioration in the vehicle VC1 makes it difficult to set a small rotation fluctuation ΔNE. The factors of the absolute value of the rotation fluctuation ΔNE becoming greater as the vehicle VC1 deteriorates include the above-described factor and also include, for example, an increase in the variations in air-fuel ratios between the cylinders.

When determining that the logical conjunction of the conditions (i) to (v) is true (S34: YES), the CPU 72 assigns 10 to a reward r (S36). When determining that the logical conjunction is false (S34: NO), the CPU 72 assigns −10 to the reward r (S38). When the process of S36 or S38 is completed, the CPU 72 updates the relationship defining data DR stored in the memory device 76 shown in FIG. 1. In the present embodiment, the relationship defining data DR is updated by the s-soft on-policy Monte Carlo method.

That is, the CPU 72 adds the reward r to respective returns R(Sj, Aj), which are determined by pairs of the states obtained through the process of S32 and actions corresponding to the respective states (S40). R(Sj, Aj) collectively represents the returns R each having one of the elements of the state set Sj as the state and one of the elements of the action set Aj as the action. Next, the CPU 72 averages each of the returns R(Sj, Aj), which are determined by pairs of the states and the corresponding actions obtained through the process of S32, and assigns the averaged values to the corresponding action value functions Q(Sj, Aj) (S42). The averaging process simply needs to be a process of dividing the return R, which is calculated through the process of S40, by a number obtained by adding a predetermined number to the number of times the process S40 has been executed. The initial value of the return R simply needs to be set to the initial value of the corresponding action value function Q.

Next, for each of the states obtained through the process of S32, the CPU 72 assigns, to an action Aj*, an action that is the combination of the throttle command value TA* and the retardation amount aop when the corresponding action value function Q(Sj, A) has the maximum value (S44). The sign A represents an arbitrary action that can be taken. The action Aj* can have different values depending on the type of the state obtained through the process of S32. In view of simplification, the action Aj* has the same sign regardless of the type of the state in the present description.

Next, the CPU 72 updates the policy 7 corresponding to each of the states obtained through the process of S32 (S46). That is, the CPU 72 sets the selection probability of the action Aj* selected through S44 to $(1-\varepsilon)+\varepsilon/|A|$, where $|A|$ represents the total number of actions. The number of the actions other than the action Aj* is represented by $|A|-1$. The CPU 72 sets the selection probability of each of the actions other than the action Aj* to $\varepsilon/|A|$. The process of S46 is based on the action value function Q, which has been updated through the process of S42. Accordingly, the relationship defining data DR, which defines the relationship between the state s and the action a, is updated to increase the return R.

When the process of S46 is completed, the CPU 72 temporarily suspends the series of processes shown in FIG. 3.

Referring back to FIG. 2, the CPU 72 temporarily suspends the series of processes shown in FIG. 2 when the process of S28 is completed or when a negative determination is made in any of the processes of S20 and S24. The processes of S10 to S26 are implemented by the CPU 72 executing the control program 74*a*, and the process of S28 is implemented by the CPU 72 executing the learning program 74*b*. The relationship defining data DR at the shipment of the vehicle VC1 is learned in advance through the process similar to the process shown in FIG. 2, for example, by simulating traveling of the vehicle VC1 on the test bench.

The operation and advantages of the present embodiment will now be described.

The CPU 72 obtains time-series data of the accelerator operation amount PA as the user operates the accelerator pedal 86, and sets the action a, which includes the throttle command value TA* and the retardation amount aop, according to the policy T. Basically, the CPU 72 selects the action a that maximizes the expected return, based on the action value function Q defined by the relationship defining data DR. However, the CPU 72 searches for the action a that maximizes the expected return by selecting, with the predetermined probability, actions other than the action a that maximizes the expected return. This allows the relationship defining data DR to be updated through reinforcement learning as the user drives the vehicle VC1. Thus, the throttle command value TA* corresponding to the accelerator operation amount PA and the retardation amount aop can be set to appropriate values for driving of the vehicle VC1 without excessively increasing the man-hours by skilled workers.

If the vehicle VC1 deteriorates, the standard that was able to be met by the action a prior to the deterioration of the vehicle VC1 may not be able to be met. For example, in a case where there are no actions a that meet all of condition (iii) to condition (v), even if any action a is selected, the action value function Q in which the selected action a is included in the independent variable is corrected such that the action value function Q decreases. In such a case, a greedy action cannot be searched for.

In the present embodiment, when the traveled distance RL of the vehicle VC1 is the predetermined distance, the vehicle VC1 is determined as having deteriorated and the condition (iii) to condition (v) are loosened. This allows for the discovery of the action a that meets all the condition (iii) to condition (v). Consequently, an optimum action a for the deteriorated vehicle VC1 is discovered.

In a case where the action value function Q is prohibited from being updated as the vehicle VC1 deteriorates, the vehicle VC1 subsequent to the deterioration is controlled by a greedy action for the vehicle VC1 prior to the deterioration. However, the greedy action does not necessarily have to be the same prior to and subsequent to the deterioration of the vehicle VC1. Even for the same throttle opening degree TA, if deposit accumulates on the throttle valve 14 and the intake passage 12, the cross-sectional flow area of the intake passage 12 is reduced. This reduces the intake air amount Ga. Accordingly, the throttle command value TA* that maximizes the expected return in correspondence with the time-series data of the accelerator operation amount PA compensates for changes in the cross-sectional flow area of the intake passage 12 resulting from the accumulation of deposit on the throttle valve 14, and thus the throttle command value TA* differs from a value prior to the accumulation of deposit. Therefore, for the deteriorated vehicle VC1 to execute an optimum control, it is desired that the action value function Q be updated in the deteriorated vehicle VC1.

The above-described present embodiment further provides the following operational advantages.

(1) The traveled distance RL is set to a deterioration variable that indicates the degree of deterioration of the vehicle VC1. This allows the deterioration variable to be calculated through simple computation.

(2) The time-series data of the accelerator operation amount PA is included in the independent variable of the action value function Q. Thus, as compared with when, for example, only a single sampled value for the accelerator operation amount PA is set as the independent variable, the value of the action a is finely adjusted for various changes in the accelerator operation amount PA.

(3) The throttle command value TA* is included in the independent variable of the action value function Q. Thus, as compared with when, for example, parameters in a model expression in which the behavior of the throttle command value TA* is modelled are set as the independent variable for the throttle opening degree, the degree of freedom of searching through reinforcement learning is easily increased.

Second Embodiment

A second embodiment will now be described with reference to FIGS. 4 and 5. Differences from the first embodiment will mainly be discussed.

In the present embodiment, reinforcement learning is applied to an idle speed control.

Figure 4:
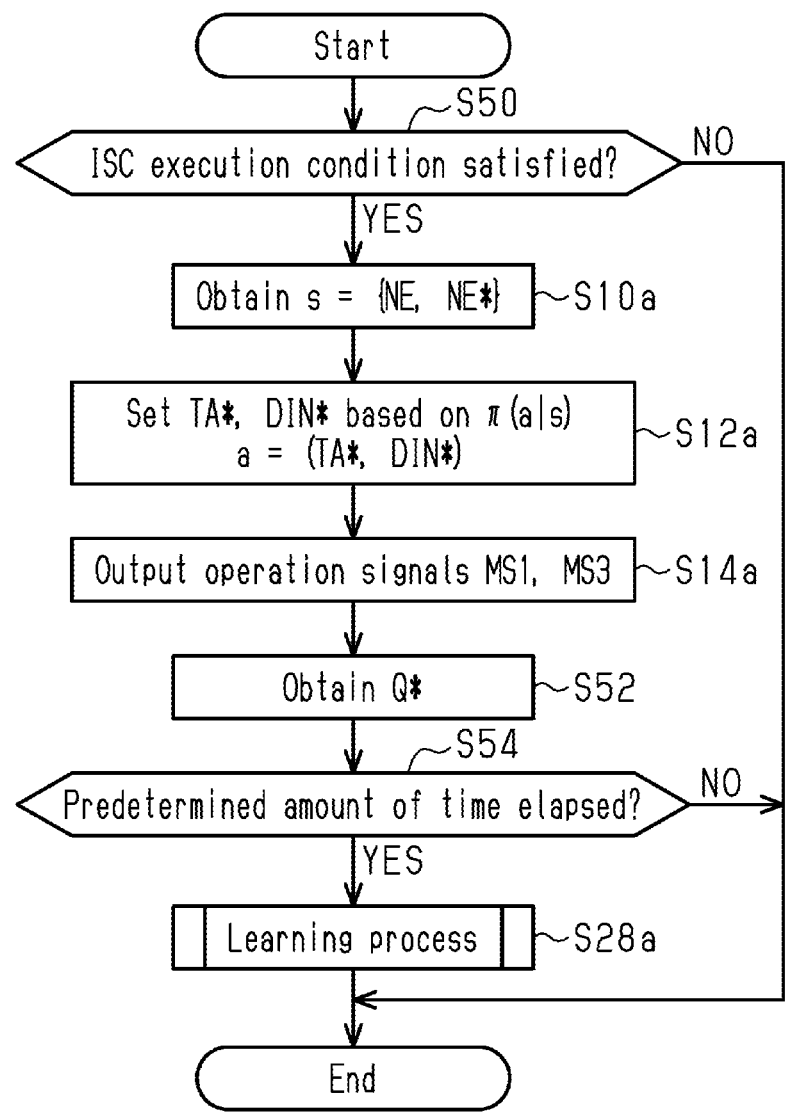
FIG. 4 is a flowchart showing a procedure of processes executed by the controller according to a second embodiment of the present disclosure.

FIG. 4 shows a procedure of processes executed by the controller 70 of the present embodiment. The processes shown in FIG. 4 are implemented by the CPU 72 repeatedly executing the control program 74a and the learning program 74b stored in the ROM 74, for example, at predetermined intervals.

In a series of processes shown in FIG. 4, the CPU 72 first determines whether an execution condition of the idle speed control has been satisfied (S50). For example, the execution condition simply needs to be that the logical conjunction of the accelerator operation amount PA being zero and the rotation speed NE being less than or equal to a predetermined value is true.

When determining that the execution condition of the idle speed control has been satisfied (S50: YES), the CPU 72 acquires the rotation speed NE and a target rotation speed NE* as the state s (S10a). For example, the CPU 72 simply needs to calculate a greater target rotation speed NE* when the axial torque required by the internal combustion engine 10 is large than when the axial torque is small.

Next, in accordance with the policy 7 defined by the relationship defining data DR, the CPU 72 sets the action a corresponding to the states obtained through the process of S10a (S12a). The action a includes the throttle command value TA* corresponding to the state s and an intake phase difference command value DIN*, which is a command value of an intake phase difference DIN. The intake phase difference DIN is the difference of the rotation angle of the intake camshaft 40 relative to the rotation angle of the crankshaft 28.

Next, the CPU 72 outputs the operation signal MS1 to the throttle valve 14 based on the set throttle command value TA* and intake phase difference command value DIN*, thereby controlling the throttle opening degree TA, and outputs the operation signal MS4 to the intake valve timing adjustment device 44, thereby feedback-controlling the intake phase difference DIN (S14a). The intake phase difference DIN is calculated by the CPU 72 based on the output signal Scr of the crank angle sensor 84 and the output signal Sca of the cam angle sensor 85.

Next, the CPU 72 acquires an injection amount command value Q* (S52). The injection amount command value Q* is calculated by the CPU 72 as, for example, a fuel amount necessary to control the air-fuel ratio of the air-fuel mixture in the combustion chamber 24 to a target value.

The CPU 72 determines whether a predetermined period has elapsed from the retarded one of the point in time of switching from a state in which a negative determination is executed in the process of S50 to a state where an affirmative determination is executed in the process of S50 and the point in time of executing the process of S28a, which will be described later (S54). When determining that the predetermined period has elapsed (S54: YES), the CPU 72 updates the relationship defining data DR (S28a).

Figure 5:
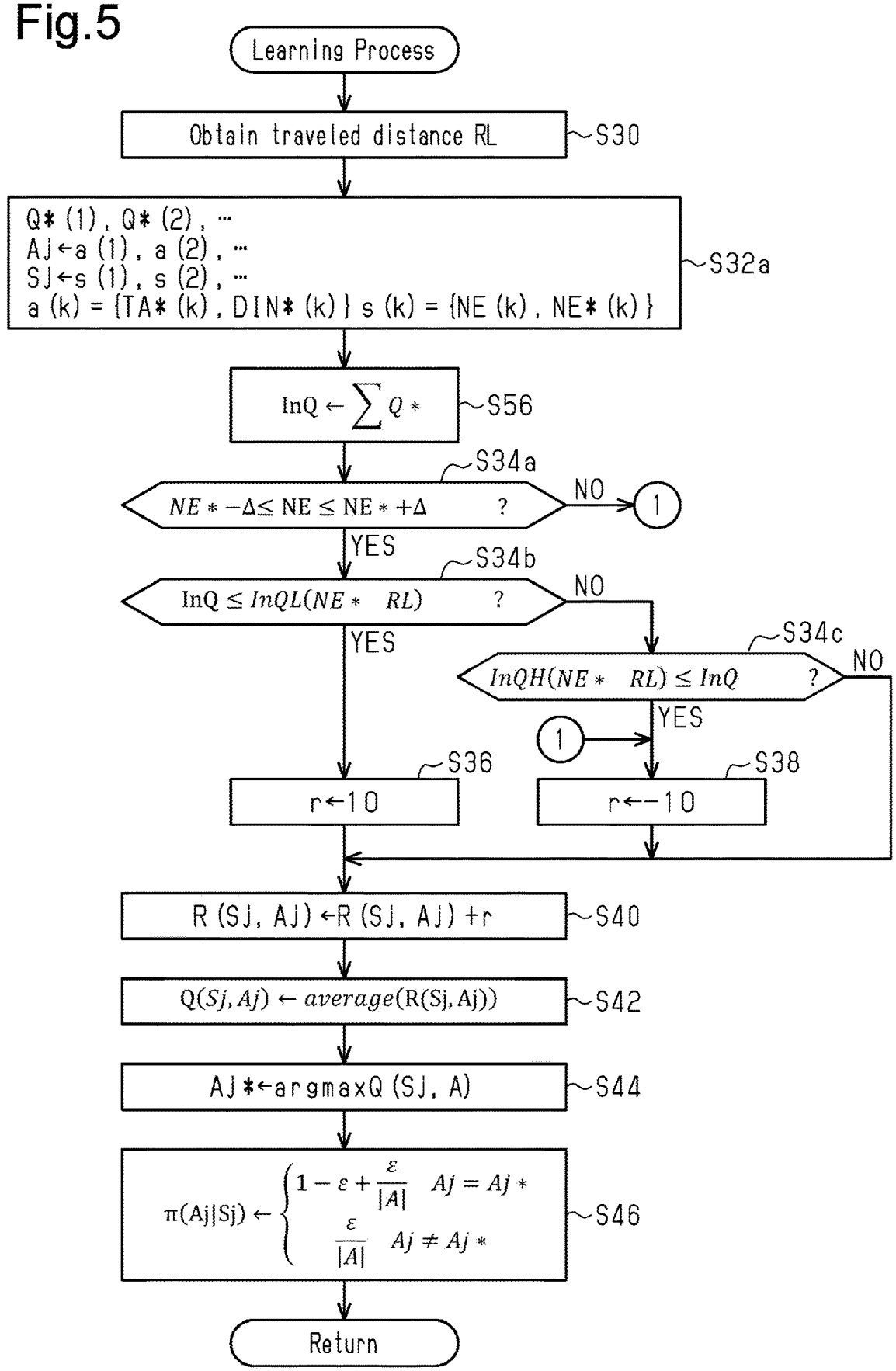
FIG. 5 is a flowchart showing a detailed procedure of some of the processes executed by the controller according to the second embodiment.

FIG. 5 illustrates the details of the process of S28a. In FIG. 5, the same step numbers are given to the processes that correspond to those in FIG. 3.

In the series of processes shown in FIG. 5, upon completion of the process of S30, the CPU 72 acquires time-series data of the injection amount command value Q* in the predetermined period and time-series data of the state s and the action a (S32a). Next, the CPU 72 calculates an integration value InQ of the time-series data of the injection amount command value Q* (S56).

The CPU 72 determines whether a condition (vi) in which the absolute value of the difference between the rotation speed NE and the target rotation speed NE* in the predetermined period is less than or equal to a predetermined value A is satisfied (S34a). When determining that the condition (vi) is satisfied (S34a: YES), the CPU 72 determines whether a condition (vii) in which the integration value InQ is less than or equal to a consumption lower limit InQL is satisfied (S34b). The CPU 72 varies the consumption lower limit InQL in correspondence with the target rotation speed NE* and the traveled distance RL. Specifically, the CPU 72 sets a greater consumption lower limit InQL when the target rotation speed NE* is high than when the target rotation speed NE* is low. Further, the CPU 72 sets a greater consumption lower limit InQL when the traveled distance RL is greater than or equal to a predetermined distance than when the traveled distance RL is less than the predetermined distance. When determining that the condition (vii) is satisfied (S34b: YES), the CPU 72 proceeds to the process of S36.

In contrast, when determining that the integration value InQ is greater than the consumption lower limit InQL (S34b: NO), the CPU 72 determines whether a condition (viii) in which the integration value InQ is greater than or equal to a consumption upper limit InQH is satisfied (S34c). The CPU 72 varies the consumption upper limit InQH in correspondence with the target rotation speed NE* and the traveled distance RL. Specifically, the CPU 72 sets a greater consumption upper limit InQH when the target rotation speed NE* is high than when the target rotation speed NE* is low. Further, the CPU 72 sets a greater consumption upper limit InQH when the traveled distance RL is greater than or equal to the predetermined distance than when the traveled distance RL is less than the predetermined distance. When determining that the condition (viii) is satisfied (S34c: YES) or making a negative determination in the process of S34a, the CPU 72 proceeds to the process of S38.

When completing any of the processes of S36 and S38 or making a negative determination in the process of S34c, the CPU 72 executes the processes of S40 to S46 in the same manner as FIG. 3. The action value function Q in the process of FIG. 5 differs from the action value function Q in the process of FIG. 3 in that, for example, the state s in FIG. 5 is a set of the rotation speed NE and the throttle command value TA* and the action a includes the throttle command value TA* and the intake phase difference command value DIN*.

When the process of S46 is completed, the CPU 72 temporarily suspends the series of processes shown in FIG. 5.

Referring back to FIG. 4, the CPU 72 temporarily suspends the series of processes shown in FIG. 4 when the process of S28a is completed or when a negative determination is made in any of the processes of S50 and S54. The processes of S50, S10a, S12a, S14a, S52, S54 are implemented by the CPU 72 executing the control program 74a, and the process of S28a is implemented by the CPU 72 executing the learning program 74b. The relationship defining data DR at the shipment of the vehicle VC1 is learned in advance through the process similar to the process shown in FIG. 4, for example, by simulating traveling of the vehicle VC1 on the test bench.

The operation and advantage of the present embodiment will now be described.

In the idle speed control, the CPU 72 controls the rotation speed NE to the target rotation speed NE* not only by setting the target rotation speed NE* as the operation amount but also by setting the intake phase difference DIN as the operation amount. This allows control to be executed with a smaller fuel consumption than when, for example, the idle speed control is executed with the intake phase difference command value DIN* fixed. However, adding the intake phase difference command value DIN* to the operation amount increases adaptation man-hours. In the present embodiment, the idle speed control is executed using the relationship defining data DR learned through reinforcement learning.

In addition, the CPU 72 sets the action a including the throttle command value TA* and the intake phase difference command value DIN* according to the policy 7. Basically, the CPU 72 selects the action a that maximizes the expected return, based on the action value function Q defined by the relationship defining data DR. However, the CPU 72 searches for the action a that maximizes the expected return by selecting, with the predetermined probability ($\varepsilon-\varepsilon/|A|$), actions other than the action a that maximizes the expected return. This allows the relationship defining data DR to be updated, through reinforcement learning, to proper data on which the individual differences and over-time changes in the internal combustion engine 10 are reflected.

In the present embodiment, the fact is taken into consideration that the deterioration of the vehicle VC1 such as an increase in the friction of the sliding part of the vehicle VC1 may increase the fuel consumption required for the idle speed control. That is, when the vehicle VC1 deteriorates, the condition (vii) and the condition (viii) are loosened. Accordingly, an optimum action a for the deteriorated vehicle VC1 is discovered through searching.

Third Embodiment

A second embodiment will now be described with reference to FIGS. 6 and 7. Differences from the second embodiment will mainly be discussed.

In the present embodiment, the relationship defining data DR is updated outside the vehicle VC1.

Figure 6:
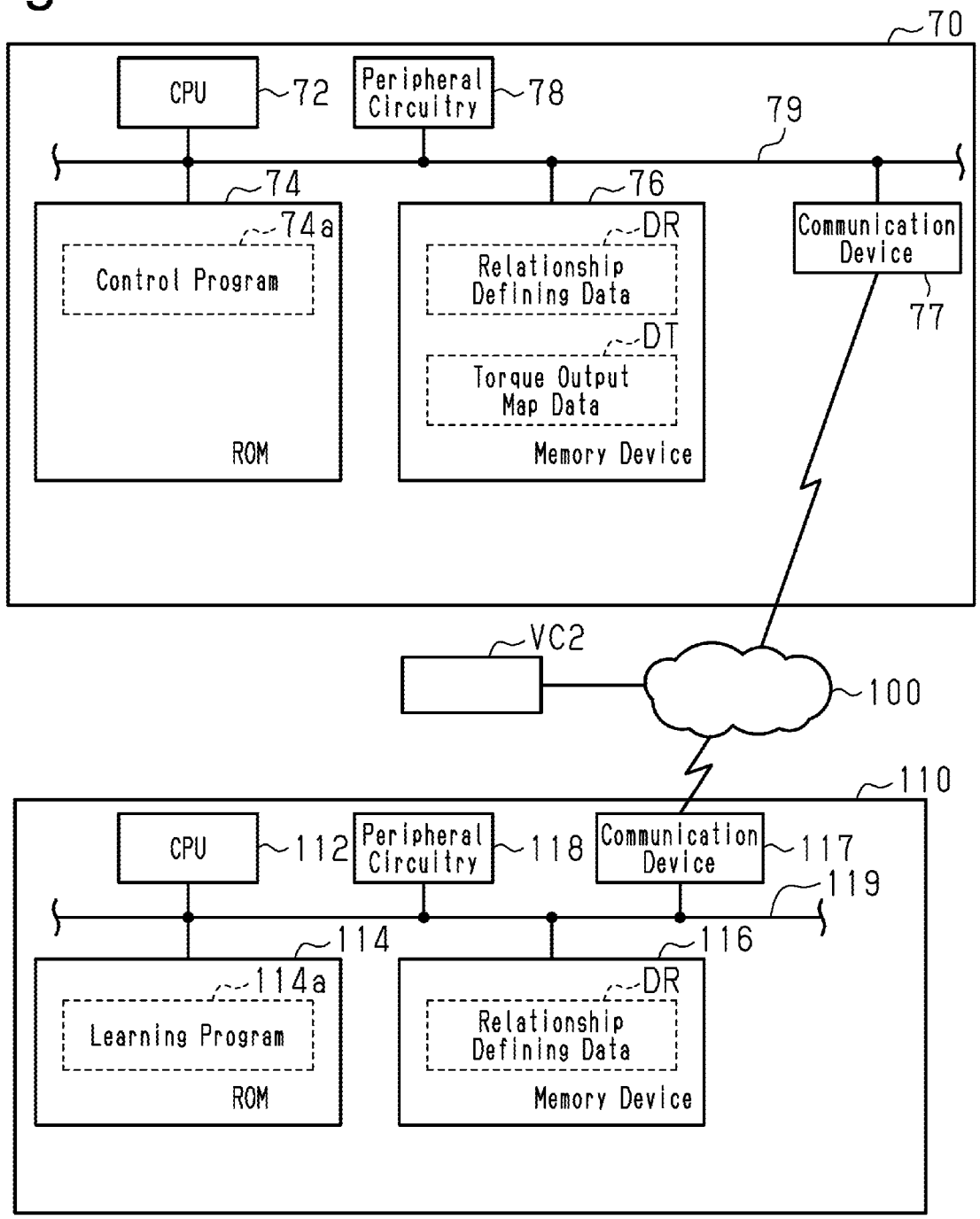
FIG. 6 is a diagram showing the configuration of a vehicle control system according to a third embodiment of the present disclosure.

FIG. 6 shows the configuration of a control system that performs reinforcement learning. In FIG. 6, the same reference numerals are given to the components that are the same as those in FIG. 1 for the illustrative purposes.

The ROM 74 of the controller 70 in the vehicle VC1 shown in FIG. 6 stores the control program 74a, but does not store the learning program 74b. The controller 70 includes a communication device 77. The communication device 77 communicates with a data analysis center 110 via a network 100 outside the vehicle VC1.

The data analysis center 110 analyzes data transmitted from vehicles VC1, VC2, . . . . The data analysis center 110 includes a CPU 112, a ROM 114, a nonvolatile memory that can be electrically rewritten (memory device 116), peripheral circuitry 118, and a communication device 117, which can communicate with each other through a local network 119. The ROM 114 stores a learning program 114a, and the memory device 116 stores the relationship defining data DR.

FIG. 7 shows a procedure of processes of reinforcement learning according to the present embodiment. The process shown in a section (a) of FIG. 7 is implemented by the CPU 72 executing the control program 74a stored in the ROM 74 shown in FIG. 6. The process shown in a section (b) of FIG. 7 is implemented by the CPU 112 executing the learning program 114a stored in the ROM 114. In FIG. 7, the same step numbers are given to the processes that correspond to those in FIG. 2. The process shown in FIG. 7 will now be described with reference to the temporal sequence of the reinforcement learning.

In the series of processes shown in the section (a) of FIG. 7, the CPU 72 executes the processes of S10 to S26. When completing the process of S22 or S26, the CPU 72 operates the communication device 77 to transmit data necessary for the update process of the relationship defining data DR (S60). The transmitted data includes the state s set in the process of S10 within a predetermined amount of time, the action a set in the process of S12 within the predetermined amount of time, and the torque command value Trq*, the torque Trq, the acceleration Gx, the noise intensity VN, the vibration intensity VV, and the rotation fluctuation ΔNE obtained in the process of S16 within the predetermined amount of time.

As shown in the section (b) of FIG. 7, the CPU 112 receives the data transmitted from the vehicle VC1 (S70), and updates the relationship defining data DR based on the received data (S28). The CPU 112 determines whether the number of times of update of the relationship defining data DR is greater than or equal to a predetermined number of times (S72). When determining that the number of times of update is greater than or equal to the predetermined number of times (S72: YES), the CPU 112 operates the communication device 117 to transmit the relationship defining data DR to the vehicle VC1, which transmitted the data that was received by the data analysis center 110 through the process of S70 (S74). When completing the process of S74 or when making a negative determination in the process of S72, the CPU 112 temporarily suspends the series of processes shown in the section (b) of FIG. 7.

As shown in the section (a) of FIG. 7, the CPU 72 determines whether there is update data related to the relationship defining data DR (S62). When determining that there is update data (S62: YES), the CPU 72 receives the updated relationship defining data DR (S64). Then, the CPU 72 rewrites the relationship defining data DR used in the process of S12 with the received relationship defining data DR (S66). When completing the process of S66 or when making a negative determination in the process of any of S20, S24, and S62, the CPU 112 temporarily suspends the series of processes shown in the section (a) of FIG. 7.

As described above, the present embodiment updates the relationship defining data DR outside the vehicle VC1. This reduces the computation load on the controller 70. Further, if the process of S28 is executed by the data analysis center 110 receiving data from multiple vehicles VC1, VC2 in the process of S70, the number of data sets used for learning can be increased easily.

Correspondence

The correspondence between the items in the above exemplary embodiments and the items described in the above SUMMARY is as follows. Below, the correspondence is shown for each of the numbers in the examples described in the above SUMMARY.

[1], [3] The execution device corresponds to the CPU 72 and the ROM 74, and the memory device corresponds to the memory device 76.

The obtaining process corresponds to the processes of S10, S16, S30 in FIGS. 2 and 3 and the process of S10a, S52, S30 in FIGS. 4 and 5.

The operation process corresponds to the process of S14 in FIG. 2 and the process of S14a in FIG. 4.

The reward calculating process corresponds to the processes of S34 to S38 in FIG. 3 and the processes of S34a, S34b, S34c, S36, S38 in FIG. 5.

The update process corresponds to the processes of S40 to S46.

The update map corresponds to the map defined by the command that executes the processes of S40 to S46 in the learning program 74b.

The loosening process corresponds to varying the noise upper limit VNth, the vibration upper limit VVth, and the fluctuation upper limit Δth in correspondence with the traveled distance RL in the process of S34. Alternatively, the loosening process corresponds to varying the consumption lower limit InQL in correspondence with the traveled distance RL in the process of S34b and varying the consumption upper limit InQH in correspondence with the traveled distance RL in the process of S34c.

[2] The noise-vibration variable corresponds to the noise intensity VN and the vibration intensity VV.

[4] The efficiency lower limit corresponds to the consumption upper limit InQH.

[5]-[7] The first execution device corresponds to the CPU 72 and the ROM 74, and the second execution device corresponds to the CPU 112 and the ROM 114.

[8] The computer corresponds to the CPU 72 of FIG. 1 or the CPUs 72, 112 in FIG. 6.

Other Embodiments

The above-described embodiments may be modified as follows. The above-described embodiments and the following modifications can be combined as long as the combined modifications remain technically consistent with each other.

Regarding Action Variable

In the process of FIG. 2, the throttle command value TA* is used as an example of the variable related to the opening degree of a throttle valve, which is an action variable. However, the present disclosure is not limited to this. For example, the responsivity of the throttle command value TA* to the accelerator operation amount PA may be expressed by dead time and a secondary delay filter, and three variables, which are the dead time and two variables defining the secondary delay filter, may be used as variables related to the opening degree of the throttle valve. In this case, the state variable is preferably the amount of change per unit time of the accelerator operation amount PA instead of the time-series data of the accelerator operation amount PA.

In the above-described embodiments, the retardation amount aop is used as the variable related to the ignition timing, which is an action variable. However, the present disclosure is not limited to this. For example, the ignition timing, which is corrected by a KCS, may be used as the variable related to the ignition timing.

In the processes of FIGS. 2 and 7, the variable related to the opening degree of the throttle valve and the variable related to the ignition timing are used as examples of action variables. However, the present disclosure is not limited to this. For example, the variable related to the opening degree of the throttle valve and the variable related to the ignition timing may be replaced by the fuel injection amount. With regard to these three variables, only the variable related to the opening degree of the throttle valve or the fuel injection amount may be used as the action variable. Alternatively, only the variable related to the ignition timing and the fuel injection amount may be used as the action variables. Only one of the three variables may be used as the action variable.

As described in the Regarding Internal Combustion Engine section below, in the case of a compression ignition internal combustion engine, a variable related to an injection amount simply needs to be used in place of the variable related to the opening degree of the throttle valve, and a variable related to the injection timing may be used in place of the variable related to the ignition timing. In addition to the variable related to the injection timing, it is preferable to use a variable related to the number of times of injection within a single combustion cycle and a variable related to the time interval between the ending point in time of one fuel injection and the starting point in time of the subsequent fuel injection for a single cylinder within a single combustion cycle.

For example, in a case in which the transmission 60 is a multi-speed transmission, the action variable may be the value of the current supplied to the solenoid valve that adjusts the engagement of the clutch using hydraulic pressure.

For example, as described the Regarding Vehicle section below, when a hybrid vehicle, an electric vehicle, or a fuel cell vehicle is used as the vehicle, the action variable may be the torque or the output of the rotating electric machine. Further, when the present disclosure is employed in a vehicle equipped with an air conditioner that includes a compressor, and the compressor is driven by the rotational force of the engine crankshaft, the action variable may include the load torque of the compressor. When the present disclosure is employed in a vehicle equipped with a motor-driven air conditioner, the action variables may include the power consumption of the air conditioner.

Regarding State

In the processes of FIGS. 2 and 7, the time-series data of the accelerator operation amount PA includes six values that are sampled at equal intervals. However, the present disclosure is not limited to this. The time-series data of the accelerator operation amount PA may be any data that includes two or more values sampled at different sampling points in time. It is preferable to use data that includes three or more sampled values or data of which the sampling interval is constant.

The state variable related to the accelerator operation amount is not limited to the time-series data of the accelerator operation amount PA. For example, as described in the Regarding Action Variable section above, the amount of change per unit time of the accelerator operation amount PA may be used.

For example, when the current value of the solenoid valve is used as the action variable as described in the Regarding Action Variable section above, the state simply needs to include the rotation speed of the input shaft 62 of the transmission, the rotation speed of the output shaft 64, and the hydraulic pressure regulated by the solenoid valve. Also, when the torque or the output of the rotating electric machine is used as the action variable as described in the Regarding Action Variable section above, the state simply needs to include the state of charge and the temperature of the battery. Further, when the action includes the load torque of the compressor or the power consumption of the air conditioner, the state simply needs to include the temperature in the passenger compartment.

Regarding Reduction of Dimensions of Table-Type Data

The method of reducing the dimensions of table-type data is not limited to the one in the above-described embodiments. The accelerator operation amount PA rarely reaches the maximum value. Accordingly, the action value function Q does not necessarily need to be defined for the state in which the accelerator operation amount PA is greater than or equal to the specified amount, it is possible to adapt the throttle command value TA* and the like independently when the accelerator operation amount PA is greater than or equal to the specified value. The dimensions may be reduced by removing, from possible values of the action, values at which the throttle command value TA* is greater than or equal to the specified value.

The dimensions of data do not necessarily have to be reduced. For example, regarding the third embodiment, reinforcement learning is hypothetically performed based on the data from multiple vehicles. In this case, prior to the shipment of the vehicles, the action value function may be learned only for some of the data where the dimensions have been reduced. Further, subsequent to the shipment, all the actions may be executable through searching. This allows the data used for learning to be provided more sufficiently subsequent to the shipment of the vehicles than prior to the shipment. In view of this, subsequent to the shipment of the vehicles, more proper actions are discovered by increasing the number of actions that may be taken as search.

Regarding Relationship Defining Data

In the above-described embodiments, the action value function Q is a table-type function. However, the present disclosure is not limited to this. For example, a function approximator may be used.

For example, instead of using the action value function Q, the policy $\pi$ may be expressed by a function approximator that uses the state s and the action a as independent variables and uses the probability that the action a will be taken as a dependent variable. Further, parameters defining the function approximator may be updated in accordance with the reward r.

Regarding Operation Process

For example, when using a function approximator as the action value function Q as described in the Regarding Relationship Defining Data section above, all the groups of discrete values related to actions that are independent variables of the table-type function of the above-described embodiments simply need to be input to the action value function Q together with the state s, so as to select the action a that maximizes the action value function Q.

For example, when the policy $\pi$ is a function approximator that uses the state s and the action a as independent variables, and uses the probability that the action a will be taken as a dependent variable as in the Regarding Relationship Defining Data section above, the action a is specified based on the probability indicated by the policy $\pi$. Based on the specified action a, the action used for the operation may be selected.

Regarding Update Map

The F-soft on-policy Monte Carlo method is executed in the process of S40 to S46. However, the present disclosure is not limited to this. For example, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

For example, when the policy 7 is expressed using a function approximator, and the function approximator is directly updated based on the reward r, the update map is preferably constructed using, for example, a policy gradient method.

The present disclosure is not limited to the configuration in which only one of the action value function Q and the policy 7 is directly updated using the reward r. For example, the action value function Q and the policy 7 may be separately updated as in an actor critic method. In an actor critic method, the function Q and the policy $\pi$ do not necessarily need to be updated. For example, in place of the action value function Q, a value function V may be updated.

The letter $\varepsilon$ defining the policy $\pi$ is not limited to a fixed value and may be changed in accordance with the rule defined in advance according to the degree of learning progress.

Regarding Reward Calculating Process

In the process of FIG. 3, the reward is provided depending on whether the logical disjunction of the conditions (i) to (v) is true. However, the present disclosure is not limited to this. For example, it is possible to execute a process that provides the reward depending on whether the condition (i) is met, a process that provides the reward depending on whether the condition (ii) is met, a process that provides the reward depending on whether the condition (iii) is met, a process that provides the reward depending on whether the condition (iv) is met, and a process that provides the reward depending on whether the condition (v) is met. Even in this case, when the values of the action variables that meet the conditions (iii) to (v) do not exist and multiple values of the action variables that meet the conditions (i) and (ii) exist, the greedy action cannot be specified. Thus, loosening at least one of the conditions (iii) to (v) is effective. Alternatively, regarding three processes, namely, the process that provides the reward depending on whether the condition (iii) is met, the process that provides the reward depending on whether the condition (iv) is met, and the process that provides the reward depending on whether the condition (v) is met, only one or two of the three processes may be executed.

For example, instead of providing the same reward without exception when the condition (i) is met, a process may be executed in which a greater reward is provided when the absolute value of the difference between the torque Trq and the torque command value Trq* is small than when the absolute value is great. Also, instead of providing the same reward without exception when the condition (i) is not met, a process may be executed in which a smaller reward is provided when the absolute value of the difference between the torque Trq and the torque command value Trq* is great than when the absolute value is small.

For example, instead of providing the same reward without exception when the condition (ii) is met, a process may be executed in which the reward is varied in accordance with the acceleration Gx. Also, instead of providing the same reward without exception when the condition (ii) is not met, a process may be executed in which the reward is varied in accordance with the acceleration Gx.

For example, instead of providing the same reward without exception when the condition (iii) is met, a process may be executed in which the reward is varied in accordance with the noise intensity VN. Also, instead of providing the same reward without exception when the condition (iii) is not met, a process may be executed in which the reward is varied in accordance with the noise intensity VN. As described in the Regarding Vehicle section below, it is preferred that the process that gives a greater reward when the condition (iii) is met than when the condition (iii) is not met be applied to a hybrid vehicle, an electric vehicle, or a fuel cell vehicle.

For example, instead of providing the same reward without exception when the condition (iv) is met, a process may be executed in which the reward is varied in accordance with the vibration intensity VV. Also, instead of providing the same reward without exception when the condition (iv) is not met, a process may be executed in which the reward is varied in accordance with the vibration intensity VV. As described in the Regarding Vehicle section below, it is preferred that the process that gives a greater reward when the condition (iii) is met than when the condition (iv) is not met be applied to a hybrid vehicle, an electric vehicle, or a fuel cell vehicle.

For example, instead of providing the same reward without exception when the condition (v) is met, a process may be executed in which the reward is varied in accordance with the rotation fluctuation ΔNE. Also, instead of providing the same reward without exception when the condition (v) is not met, a process may be executed in which the reward is varied in accordance with the rotation fluctuation ΔNE.

In the process of FIG. 5, different rewards are provided when the conditions (vi) and (vii) are met (S36), when the condition (vi) is met and the conditions (vii) and (viii) are not met (S34c: NO), and when the condition (vi) is not met or the condition (viii) is met (S38). However, the present disclosure is not limited to this. For example, the process of S36 or S38 may be executed depending on whether the logical conjunction of the condition (vi) being met and the condition (viii) being unmet is true.

The process that provides a greater reward when the energy use efficiency is greater than or equal to the efficiency lower limit than when the energy use efficiency is less than the energy use efficiency is not limited to the process that provides a reward depending on whether the condition (viii) is met. Instead, for example, the process may be to provide a greater reward when the fuel consumption with the vehicle VC1 traveling on a predetermined road is less than or equal to the consumption upper limit than when the fuel consumption is greater than the consumption upper limit. Alternatively, if the propelling force generator of the vehicle is a rotating electric machine as described in the Regarding Vehicle section, the process may be to provide a greater reward when the power consumption with the vehicle VC1 traveling on a predetermined road is less than or equal to the consumption upper limit than when the power consumption is greater than the consumption upper limit.

The reward calculating process is not limited to the process that provides the reward r depending whether the standard related to drivability is met or the process that provides a greater reward when the energy use efficiency meets a standard than when the energy use efficiency does not meet the standard. Instead, for example, the reward calculating process may be a process that provides a greater reward when the exhaust characteristic meets a standard than when the exhaust characteristic does not meet the standard. The reward calculating process may include two or three of the following processes: the process that provides a greater reward when the standard related to drivability is met than when the standard is not met; the process that provides a greater reward when the energy use efficiency meets the standard than when the energy use efficiency does not meet the standard; and the process that provides a greater reward when the exhaust characteristic meets the standard than when the exhaust characteristic does not meet the standard.

For example, when the current value of the solenoid valve of the transmission 60 is used as the action variable as described in the Regarding Action Variable section above, the reward calculating process simply needs to include one of the three processes (a) to (c).

(a) A process that provides a greater reward when time required for the transmission to change the gear ratio is within a predetermined time than when the required time is exceeds the predetermined time.

(b) A process that provides a greater reward when the absolute value of the rate of change of the rotation speed of the input shaft 62 of the transmission is less than or equal to an input-side predetermined value than when the absolute value exceeds the input-side predetermined value.

(c) A process that provides a greater reward when the absolute value of the rate of change of the rotation speed of the output shaft 64 of the transmission is less than or equal to an output-side predetermined value than when the absolute value exceeds the output-side predetermined value.

Also, when the torque or the output of the rotating electric machine is used as the action variable as described in the Regarding Action Variable section above, the reward calculating process may include the following processes: a process that provides a greater reward when the state of charge of the battery is within a predetermined range than when the state of charge is out of the predetermined range; and a process that provides a greater reward when the temperature of the battery is within a predetermined range than when the temperature is out of the predetermined range. Further, when the action variable includes the load torque of the compressor or the power consumption of the air conditioner as described in the Regarding Action Variable section above, the reward calculating process may include the following process: a process that provides a greater reward when the temperature in the passenger compartment is within a predetermined range than when the temperature is out of the predetermined range; and a process that provides a greater reward when the integration value of the power consumption of the air conditioning device is less than or equal to a predetermined value than when the integration value is greater than the predetermined value.

Regarding Deterioration Degree Variable

The variable indicating the degree of deterioration is not limited to the traveled distance RL. Instead, for example, when the vehicle includes an air-fuel ratio sensor, the variable may be the fluctuation amount of a detection value of the air-fuel ratio sensor. Alternatively, for example, when open-loop control and feedback control are performed for the air-fuel ratio, the deterioration variable may be the magnitude of the feedback control amount of the fuel injection amount given by the fuel injection valve 16.

The variable indicating the degree of deterioration is not limited to a variable that can take three or more values and may be, for example, a binary variable according to whether the vehicle has deteriorated. For example, the binary variable can be achieved as a value indicating that the vehicle has deteriorated when only a negative reward is given over a predetermined period of time.

Loosening Process

For example, as described in the Regarding Reward Calculating Process section above, when different rewards are provided according to whether each of the conditions (i) to (v) is met, the loosening process simply needs to be executed in at least one of three processes that provide different rewards according to whether each of the conditions (iii) to (v) is met. Thus, even if vehicle VC1 deteriorates, when the value of an action variable that provides a great reward exists, the greedy action is more likely to be specified for the process subject to the execution of the loosening process among the three processes.

In the process of FIG. 5, the consumption lower limit InQL of S34*b* does not have to be subject to the loosening process.

Regarding Vehicle Control System

In the processes of FIG. 7, the processes of S28 are all executed in the data analysis center 110. However, the present disclosure is not limited to this. For example, the data analysis center 110 may execute the processes of S40 to S46 in FIG. 3 or 5 and does not have to execute the processes of S34 to S38 and S34*a* to S38, which are the reward calculating process, and the result of the process of S36 or S38 may be transmitted from the controller 70 to the data analysis center 110 in the process of S60 of section (a) of FIG. 7.

The vehicle control system does not necessarily include the controller 70 and the data analysis center 110. For example, the vehicle control system may include a portable terminal carried by a user in place of the data analysis center 110, so that the vehicle control system includes the controller 70 and the portable terminal. Also, the vehicle control system may include the controller 70, a portable terminal, and the data analysis center 110. This vehicle control system is achieved by, for example, the portable terminal executing the process of S12 in FIG. 7.

Regarding Execution Device

The execution device is not limited to the device that includes the CPU 72 (112) and the ROM 74 (114) and executes software processing. For example, at least part of the processes executed by the software in the above-described embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Computer

The computer is not limited to the CPU 72 of FIG. 1 or the CPUs 72, 112 in FIG. 6. For example, the computer that generates the relationship defining data DR prior to the shipment of the vehicle VC1 and the CPU 72 mounted on the vehicle VC1 may collectively function as a single computer. In this case, only the CPU 72 needs to execute the loosening process. Thus, for example, the reward calculating process executed by the CPU 72 upon detection of the deterioration of the vehicle VC1 loosens the standard to a larger extent than the reward calculating process executed by the computer that generates the relationship defining data DR prior to being shipped. For example, subsequent to the shipment of the vehicle VC, the relationship defining data DR does not need to be updated until the deterioration of the vehicle is detected.

In the process of generating the relationship defining data DR prior to the shipment of the vehicle, the state of the vehicle may be virtually generated, without the actual vehicle, by operating the internal combustion engine 10 and the like on the test bench, thereby simulating traveling of the vehicle. The state of the vehicle, which is virtually generated through detection by sensors and the like, may be obtained and used in the reinforcement learning. In this case, the virtually generated state of the vehicle is regarded as the state of the vehicle based on the sensor values.

Regarding Memory Device

In the above-described embodiments, the memory device storing the relationship defining data DR and the memory device (ROM 74) storing the learning program 74*b* and the control program 74*a* are separate from each other. However, the present disclosure is not limited to this.

Regarding Internal Combustion Engine

The internal combustion engine does not necessarily include, as the fuel injection valve, a port injection valve that injects fuel to the intake passage 12, but may include a direct injection valve that injects fuel into the combustion chamber 24. Further, the internal combustion engine may include a port injection valve and a direct injection valve.

The internal combustion engine is not limited to a spark-ignition engine, but may be a compression ignition engine that uses, for example, light oil or the like.

Regarding Vehicle

The vehicle is not limited to a vehicle that includes only an internal combustion engine as a propelling force generator, but may be a hybrid vehicle includes an internal combustion engine and a rotating electric machine. Further, the vehicle may be an electric vehicle or a fuel cell vehicle that includes a rotating electric machine as the propelling force generator, but does not include an internal combustion engine.

Various changes inform and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising:
    an execution device; and
    a memory device, wherein
    the memory device is configured to store relationship defining data that defines a relationship between a state of a vehicle and an action variable related to an operation of an electronic device in the vehicle,
    the execution device is configured to execute
        an obtaining process that obtains the state of the vehicle based on a detection value of a sensor,
        an operation process that operates the electronic device based on a value of the action variable, the action variable being determined by the relationship defining data and the state of the vehicle obtained by the obtaining process,
        a reward calculating process that provides, based on the state of the vehicle obtained by the obtaining process, a greater reward when a characteristic of the vehicle meets a standard than when the characteristic of the vehicle does not meet the standard, and
        an update process that updates the relationship defining data by inputting, to a predetermined update map, the state of the vehicle obtained by the obtaining process, the value of the action variable used to operate the electronic device, and the reward corresponding to the operation of the electronic device,
    the update map outputs the updated relationship defining data so as to increase an expected return for the reward in a case where the electronic device is operated in accordance with the relationship defining data,
    the obtaining process includes a process that obtains a deterioration variable as the state of the vehicle, the deterioration variable indicating a degree of deterioration of the vehicle, and
    the reward calculating process includes a loosening process that loosens the standard to a larger extent when the degree of deterioration is large than when the degree of deterioration is small.

2. The vehicle controller according to claim 1, wherein
    the standard includes a condition in which a value of a noise-vibration variable is less than or equal to a noise-vibration upper limit, the noise-vibration variable being a variable that indicates one of vibration and noise of the vehicle,
    the reward calculating process includes a process that provides a greater reward when the value of the noise-vibration variable is less than or equal to the noise-vibration upper limit than when the value of the noise-vibration variable is greater than the noise-vibration upper limit, and
    the loosening process includes a process that sets the noise-vibration upper limit to be greater when the degree of deterioration is large than when the degree of deterioration is small.

3. The vehicle controller according to claim 1, wherein
    the vehicle includes an internal combustion engine as a propelling force generator,
    the standard includes a condition in which a magnitude of a rotation fluctuation of a crankshaft of the internal combustion engine is less than or equal to a fluctuation upper limit, and
    the loosening process includes a process that sets the fluctuation upper limit to be greater when the degree of deterioration is large than when the degree of deterioration is small.

4. The vehicle controller according to claim 1, wherein
    the standard includes a condition in which an energy use efficiency of a propelling force generator mounted on the vehicle is greater than or equal to an efficiency lower limit, and
    the loosening process includes a process that sets the efficiency lower limit to be smaller when the degree of deterioration is large than when the degree of deterioration is small.

5. A vehicle control system, comprising the execution device and the memory device in the vehicle controller according to claim 1, wherein
    the execution device includes a first execution device mounted on the vehicle and a second execution device that is different from an in-vehicle device,
    the second execution device is configured to execute at least the update process, and
    the first execution device is configured to execute at least the obtaining process and the operation process.

6. A vehicle control device, comprising the first execution device in the vehicle control system according to claim 5.

7. A vehicle learning device, comprising the second execution device in the vehicle control system according to claim 5.

8. A vehicle learning method, the method comprising: causing a computer to execute the obtaining process, the operation process, the reward calculating process, and the update process in the vehicle controller according to claim 1.

9. A vehicle control method that is performed by an execution device and a memory device, the vehicle control method comprising:
    storing, by the memory device, relationship defining data that defines a relationship between a state of a vehicle and an action variable related to an operation of an electronic device in the vehicle;
    obtaining, by the execution device, the state of the vehicle based on a detection value of a sensor;
    operating, by the execution device, the electronic device based on a value of the action variable, the action variable being determined by the relationship defining data and the state of the vehicle;

providing, by the execution device, based on the state of the vehicle, a greater reward when a characteristic of the vehicle meets a standard than when the characteristic of the vehicle does not meet the standard; and updating, by the execution device, the relationship defining data by inputting, to a predetermined update map, the state of the vehicle, the value of the action variable used to operate the electronic device, and the reward corresponding to the operation of the electronic device, the update map outputs the updated relationship defining data so as to increase an expected return for the reward in a case where the electronic device is operated in accordance with the relationship defining data, the obtaining the state of the vehicle includes obtaining a deterioration variable as the state of the vehicle, the deterioration variable indicating a degree of deterioration of the vehicle, and the providing the reward includes loosening the standard to a larger extent when the degree of deterioration is large than when the degree of deterioration is small.

10. A non-transitory computer readable medium that stores a vehicle control process executed by an execution device and a memory device, the vehicle control process comprising:

storing, by the memory device, relationship defining data that defines a relationship between a state of a vehicle and an action variable related to an operation of an electronic device in the vehicle;

obtaining, by the execution device, the state of the vehicle based on a detection value of a sensor;

operating, by the execution device, the electronic device based on a value of the action variable, the action variable being determined by the relationship defining data and the state of the vehicle;

providing, by the execution device, based on the state of the vehicle, a greater reward when a characteristic of the vehicle meets a standard than when the characteristic of the vehicle does not meet the standard; and updating, by the execution device, the relationship defining data by inputting, to a predetermined update map, the state of the vehicle, the value of the action variable used to operate the electronic device, and the reward corresponding to the operation of the electronic device, the update map outputs the updated relationship defining data so as to increase an expected return for the reward in a case where the electronic device is operated in accordance with the relationship defining data, the obtaining the state of the vehicle includes obtaining a deterioration variable as the state of the vehicle, the deterioration variable indicating a degree of deterioration of the vehicle, and the providing the reward includes loosening the standard to a larger extent when the degree of deterioration is large than when the degree of deterioration is small.

* * * * *